Oct. 4, 1960 N. H. DIETER, JR., ET AL 2,955,170

PHONOGRAPH PICKUPS

Filed May 7, 1958 2 Sheets-Sheet 1

INVENTORS
E. G. BAUER
N. H. DIETER, JR.
BY
Greene, Pineles & Durr
ATTORNEYS

Oct. 4, 1960　　N. H. DIETER, JR., ET AL　　2,955,170

PHONOGRAPH PICKUPS

Filed May 7, 1958　　2 Sheets-Sheet 2

INVENTORS
E. G. BAUER
N. H. DIETER, JR.

BY
Arens, Pinder & Ours [signature]

ATTORNEYS

United States Patent Office 2,955,170

Patented Oct. 4, 1960

2,955,170

PHONOGRAPH PICKUPS

Norman H. Dieter, Jr., Pleasantville, and Egon H. Bauer, Yonkers, N.Y., assignors to Sonotone Corporation, Elmsford, N.Y., a corporation of New York Filed May 7, 1958, Ser. No. 733,680

8 Claims. (Cl. 179—100.41)

This invention relates to phonograph pickups, and more particularly to phonograph pickups which are utilized for transducing undulations of record traces usually in the form of record grooves, into corresponding electric signals.

All generally used phonograph pickups have a mechano-electrical transducer which is driven by a stylus engaging a relatively movable record trace or groove of a record disc or the like, for translating the undulations of the record trace into corresponding electric signals. To satisfy the demand for pickups provided with two styli having different styli tips for selective engagement with a relatively narrow and shallow record groove, known as "microgrooves," or with wider and deeper record grooves, there was devised the novel type of phonograph pickup of Koren Patent 2,699,470, wherein a mechano-electric transducer carrying at its movable driven end two differently directed styli and having a rotary guide surface by which it is rotatably held in its support so that by rotating the mechano-electric transducer along its rotary guide surface, either one of its two styli may be brought into its operative groove-engaging stylus position for playing back records from either microgroove records or from deeper-groove records.

Among the objects of the invention is a phonograph pickup of the foregoing type, which is of greatly simplified construction, and which is formed of special though simple components which make it possible to automatically assemble them into pickups which will reproduce such records with a high degree of fidelity.

The foregoing and other objects of the invention will be best understood from the following description of exemplifications of the invention, reference being had to the accompanying drawings, wherein.

Although the phonograph pickups of the invention may be operated with any of the known types of mechano-electric transducers—including those using magnetic structudes, electrical resistance elements, and piezoelectric bodies—the present invention will be described in connection with a pickup utilizing a piezoelectric ceramic transducer of the type disclosed in Crownover et al. Patent No. 2,769,867, and the application Serial No. 536,794, filed September 27, 1955, as a continuation-in-part of co-pending applications Serial Nos. 694,386, filed August 31, 1946; 727,152, filed February 7, 1947, and 772,934, filed September 9, 1947 (now Patent 2,769,867), all assigned to the assignee of the present application. Furthermore, although the pickup of the invention may be used for playing back records from record grooves of a stationary record while the pickup moves relatively to the record groove, the present invention will be described in connection with a pickup of the type held mounted on the forward end of a tone arm having a pivotal support for enabling the stylus of the pickup to remain in engagement with a moving record groove of a conventional disc record.

Figures 1, 2, 3:
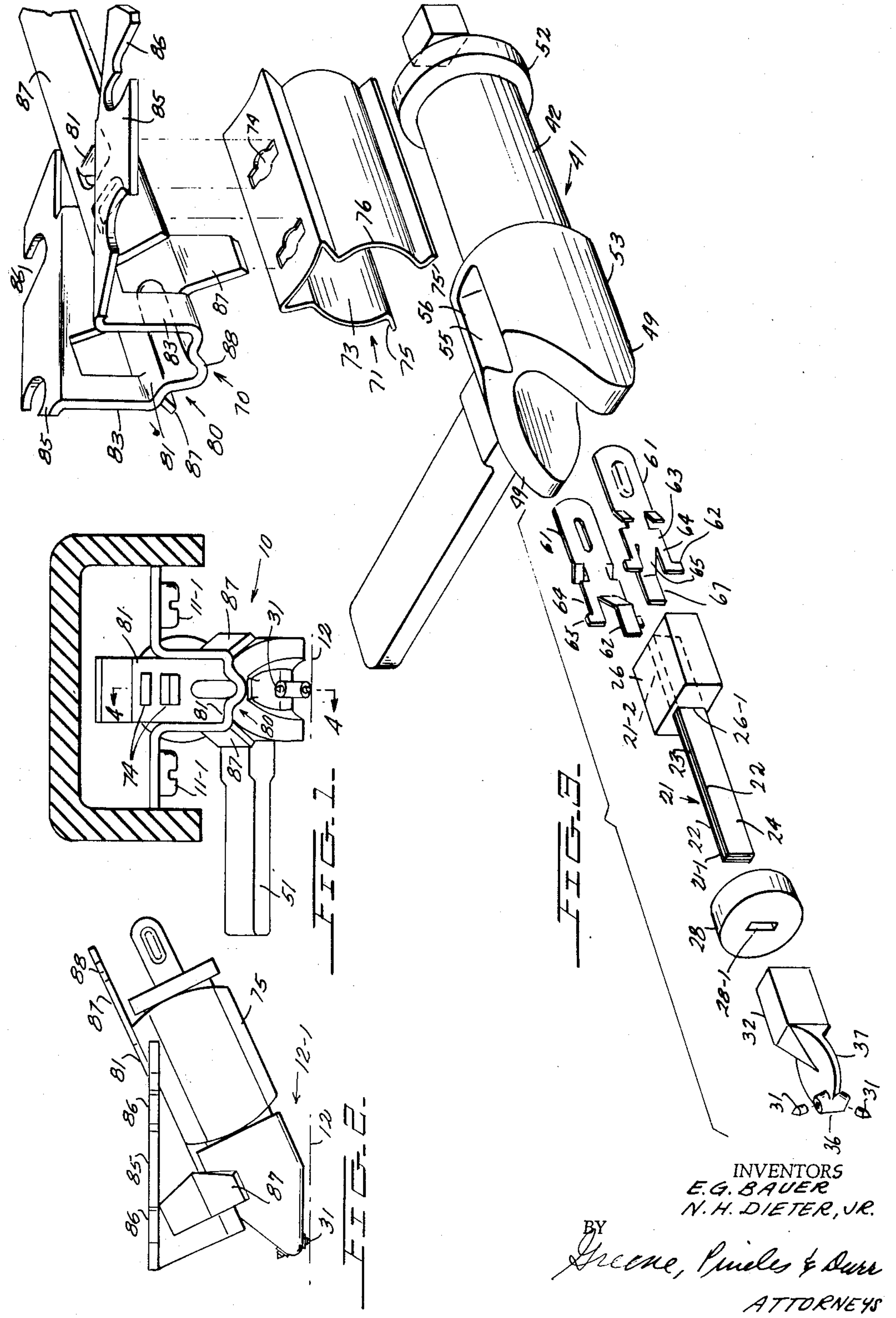
Fig. 1 is a front end view of a pickup exemplifying the invention, held in the forward end of a tone arm of a conventional disc phonograph, while one of its styli is in driving engagement with a record groove of a conventional disc record for instance.
Fig. 2 is a side elevational view of the phonograph pickup of Fig. 1.
Fig. 3 is an exploded perspective view of the same pickup.

Referring to the drawings, Figs. 1 to 5 show one form of phonograph pickup exemplifying the invention. Fig. 1 shows a pickup generally designated 10 held in its operative position on the downwardly facing side of the front end of a conventional tone arm 11 of a conventional disc phonograph, with one of the two styli 31 of the pickup engaging a record disc indicated by dash-line 12. The record disc 12 is arranged to rotate in a conventional way in clockwise direction around a generally vertical axis, and the individual spiral record traces or grooves of the disc are of substantially circular shape. The tone arm 11 has a rear end (not shown), which is mounted in a conventional way so as to permit rotation of the tone arm around a vertical axis and also for upward tilting of the tone arm. Figs. 1 and 2 are intended to show the downward pickup stylus 31 engaging a record groove of the clockwise-rotating record disc 12 moving in a record-playing direction, indicated in Fig. 2 by arrow 12—1. The particular phonograph pickup shown is intended to reproduce signals from records formed by a laterally cut groove which imparts to the pickup stylus 31 a lateral undulatory motion with respect to the perpendicular plane through the center axis of the pickup as seen in Fig. 1. However, the pickup of the invention may be readily designed for operation with a vertically cut record groove, or with a record groove cut in any other direction, for instance as in the case of the stereophonic disc records adopted by the industry, wherein the record traces extend generally transversely to opposite side walls of a record groove, which opposite side walls are inclined 45° to a surface perpendicular to the surface of the record disc or the record face.

The pickup shown operates with a mechano-electric transducer 21 which is shown formed of two strip-like ceramic piezoelectric transducer elements or bodies 22 secured to opposite sides of a metallic backing sheet element 23 and forming with it a generally elongated bilaminate piezoelectric transducer structure which when bent or strained transversely to its outer electrode surfaces 24, will generate corresponding aiding voltages impressed on its outward electrode surfaces 24. Instead of operating with a ceramic piezoelectric bilaminate of the type described above, the two ceramic bodies 22 of the piezoelectric transducer 21 may constitute two sections or parts of a continuous integral ceramic body having two opposite body sections each with its oppositely facing outer electrode surfaces 24, with the underlying two ceramic body sections electrically polarized in opposite or different directions for generating aiding voltages when the transducer 21 is subjected to bending or strains in a direction transverse to its electrode surfaces 24, such as disclosed and claimed in the co-pending application Serial No. 617,158, filed October 19, 1956, as a division of application Serial No. 772,934, filed September 9, 1947, (now Patent 2,769,867), which was filed as a continuation-in-part of co-pending applications Serial No. 694,386, and 727,152, filed, respectively, August 31, 1946 and February 7, 1947.

In the pickup shown, the forward end 21—1 of the piezoelectric transducer 21 is subjected by the stylus to an undulatory movement in the direction perpendicular or transverse to its major outer electrode surfaces 24. In order to secure uniform straining and efficient generation of corresponding electric signals, when the forward end 21—1 of the transducer is subjected to undulatory movement, the rearward part 21—2 of the transducer 21 is held restrained against motion by an elastomer biasing means or elastomer body 26.

The elastomer means or body 26 may be made of elastic organic solid material such as a vinyl chloride compound or the like, which embodies sufficient plasticizer substance to serve as a solid organic elastic elastomer body which is effective in assuring that when held compressed by a surrounding confining structure it exerts on the striplike, elongated piezoelectric transducer 21, biasing reaction forces which cause efficient generation of corresponding electric signals by proper distribution of the applied mechanical strains throughout their dielectric piezoelectric layers when the movable forward end 21—1 of the elongated piezoelectric transducer 21 is undulated by a stylus 31. Such elastomer bias bodies also operate as damping media for damping resonant peak movements of the transducer 21. By using such elastomer bias bodies for distributing the applied mechanical strains over the entire piezoelectric body of the transducer 21, resonant peaks of the transducer mechanism are effectively damped and suppressed.

The elastomer bias body 26 is molded so as to provide relatively thick elongated elastomer body portions engaging the opposite exposed transducer surfaces 24 along a relatively substantial length of the rearward region 21—2 of the elongated piezoelectric transducer 21. In practice, the elastomer body 26 is molded with an elongated central slot 26—1 of oblong or rectangular shape so as to engage with a tight bias fit the relatively long rearward region 21—2 of the piezoelectric transducer 21. An additional elastomer body 28, likewise molded with a central oblong or rectangular opening 28—1 and surrounding an intermediate portion of transducer 21, provides relatively thick opposite elastomer biasing body portions which are held compressed so as to engage with required tight bias pressure the opposite transducer surfaces 24 of a relatively short central or intermediate region 21—3 of the piezoelectic transducer.

The two differently directed styli 31 are carried by and are secured to the movable forward end 21—1 of the mechano-electric transducer 21 by a stylus junction member 32. The stylus junction member 32 is relatively rigid, and in practice may be formed, as by molding, of a plastic, organic material, such as polystyrene, or like hard organic resinous compounds, which are solid, strong and rigid at normal temperatures, up to about 120° C. for instance. The stylus junction member 32 has a coupling portion with a hollow oblong or rectangular junction compartment 33 arranged to fit over and receive therein the oblong or rectangular forward end 21—1 of the transducer. A coating of suitable cement serves to unite the interior wall surfaces of the junction member compartment 33 to the surfaces of the rectangular forward region 21—1 of the transducer 21, into a strong composite transducer body. Two of the wider opposite walls of the compartment-forming part of the stylus junction member 32 are provided with longitudinal slits 34 to permit the narrower wall regions of the compartment part thereof to yield when the forward transducer end portion 21—1 is inserted therein for securing it within the junction compartment 33 by the hardened cementitious material placed therein.

The stylus junction member 32 is provided with a coaxial forward neck extension 35 terminating at its forward end in two differently directed stylus supports 36, each carrying and holding one of the differently directed styli 31. The styli 31 may be of the conventional type, for instance a diamond or sapphire stylus, each held fixed as by cement in a suitable seating cavity or recess of the respective stylus support 36 of the stylus junction member 32.

The neck portion 35 of the stylus junction member 32 is of oblong cross-section with a larger dimension in a direction transverse to the outer transducer electrode surfaces 24, thus giving it greater stiffness in such direction, and assuring that it fully transmits to the transducer 21 stylus forces exerted in a direction perpendicular or transverse to the major outer transducer surfaces 24 in accordance with the lateral undulations of conventional record grooves.

In accordance with the invention, the elastomer biasing means are also utilized to form with the piezoelectric transducer 21 a self-supporting assembly which holds in assembled operative position the inward contact end portions or tongues 62 of the two terminal members 61, through which external circuits are connected to the outer metallic contact surfaces 24 of the transducer 21. In the form shown, each metallic terminal member 61 is made of a strip of electrically conductive sheet metal which is also elastic, such as brass. Each of the two terminal members 61 is held in its operative position on the transducer 21 by clamping engagement applied by elastomer body 26 to its forward flat contact tongue 62 for holding the respective contact tongues 62 in contact engagement with the outer metallic electrode surfaces 24 of the transducer 21 within the bias slot 26—1 of the overlying rearward elastomer bias body 26.

The elastomer biasing means of the piezoelectric transducer 21, which in the form shown consists of elastomer bodies 26, 28, is held in proper operative position by a transducer housing structure 41. Although it may be formed of other material, the housing 41 may be formed, as by molding, of relatively rigid, solid, plastic or synthetic resin material such as polystyrene, and arranged also to have an exterior rotary seating surface 42 along which it may be rotated to bring either one of its two differently directed styli 31 into a groove-engaging operative position.

Figures 4, 6, 7:
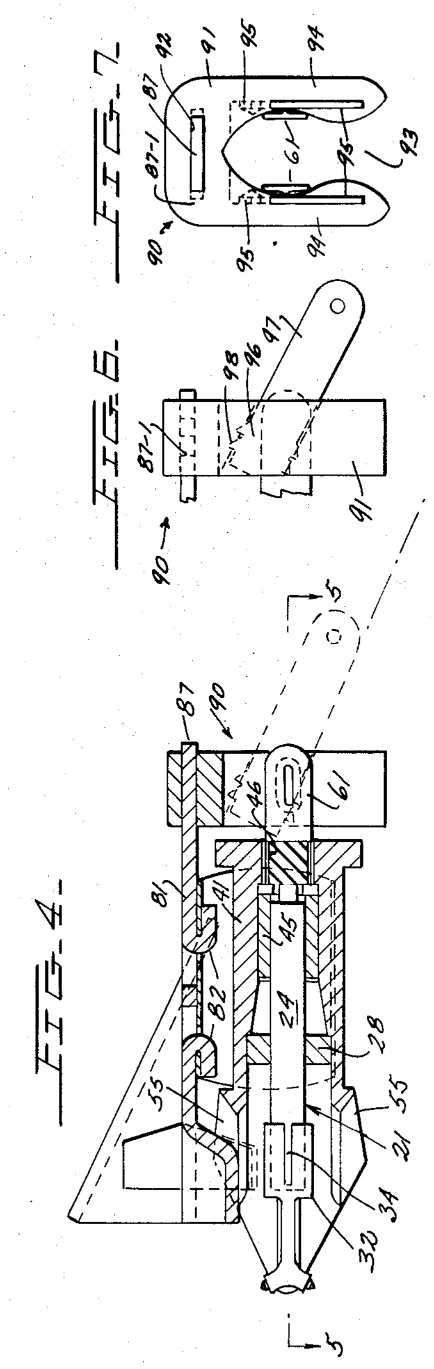
Fig. 4 is a vertical cross-sectional view of the same pickup along line 4—4 of Fig. 1, showing the pickup together with an associated fixed terminal member.
Fig. 6 is a side elevational view of the fixed terminal member of the pickup shown in Figs. 4 and 5.
Fig. 7 is an end elevational view of the fixed terminal member of Fig. 6.
Figure 8:
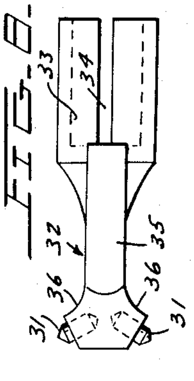
Fig. 8 is a somewhat enlarged side elevational view similar to Fig. 4, of the stylus junction body of the pickup.
Figure 9:
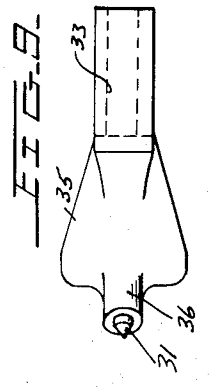
Fig. 9 is a top view of the stylus junction member.
Figure 10:
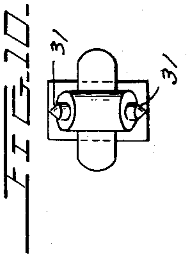
Fig. 10 is a front end view of the stylus junction member.
Figure 5:
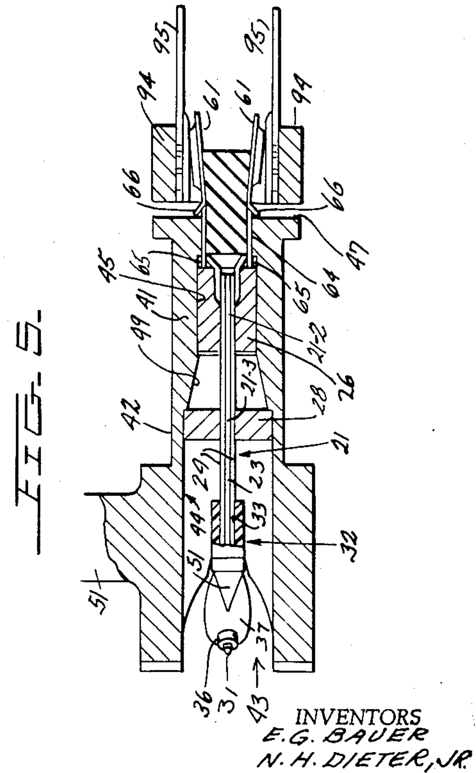
Fig. 5 is a cross-sectional view along line 5—5 of Fig. 4.

In accordance with the invention, the transducer housing member 41 is formed with a hollow interior space consisting of three specially shaped housing spaces or compartments 44, 45, 46, dimensioned and shaped so that the assembly of transducer 21 with its elastomer bias body 26 and its contact members 61 held assembled on the transducer 21, may be inserted as a unit through the forward end of the interior housing space 43 of housing 41, as seen in Figs. 4–5, in such manner that the elastomer bias body 26 and the external terminal members 61 will each be brought into and stopped and fixed or retained in their proper operative positions within the housing 41. In the particular form of pickup shown, the intermediate housing compartment 45 is of smaller width than the forward housing compartment 44, and is of rectangular shape so as to fix and hold in operative position and under operative pressure the rearward elongated elastomer bias body 26 with transducer 21 held properly biased therein. Each external terminal member strip 61 has at its forward end the narrower contact end or tongue 62 held biased in contact engagement with the outer contact surfaces of transducer 21 by the overlying body of the rearward elastomer body 26. The rearward housing compartment 46 is of smaller width than the adjoining intermediate elastomer biasing compartment 45, as seen in Figs. 3 and 4. The forward contact tongue end 62 of each external terminal member strip 61 is of somewhat smaller width than the forward end of the respective terminal strips 61, and is separated by a cut from an inclined tongue junction portion 63 of terminal strip 61. Each terminal strip 61 has over the major part of its length the same width as the rearward housing compartment 46, which is slightly smaller than the width of the housing compartment 45 within which the elastomer bias body 26 is retained.

The forward ends of the two side arms of the forward part 64 of each terminal strip 61 has two laterally extending locking projections 65 which automatically retain and lock the main section of the forward part 64 of each terminal strip in its position within the narrower rear compartment 46 of the transducer housing 41 when the transducer assembly of elements 21, 28, 26, and the two terminal members 61, are pushed inwardly through the forward end of the housing space 46 into the interior of the housing toward the operative position in which they are seen in Figs. 4 and 5. In other words, each of the external terminal strips 61 has over the major part of its length, the same width as the rectangular smallest-width rear compartment 46 of the transducer housing 41, as seen in Figs. 3 and 4, with the forward end of the contact strip 61 having lateral locking or stop projections 65 which stop the respective contact strips 61 in their operative position of Figs. 4, 5, by their engagement with the housing shoulder formed at the junction between the intermediate housing compartment 45 and the narrower rear housing compartment 46 of the transducer housing 41. This assures that when the transducer assembly with its rearward elastomer body 26 and its two metallic terminal members 61 projecting rearwardly from the transducer 21 are inserted and pushed inwardly into the elongated housing space 43, the two terminal strips 61 will enter into the narrowest rearward housing compartment 46 and be stopped and retained in their operative positions therein (Figs. 4, 6) by engagement of their forward locking projections 65 with the rearward wall shoulder of the slightly wider elastomer compartment 45 of the transducer housing 41.

In accordance with the invention, the shape and arrangement of the transducer assembly consisting of the elongated transducer structure 21 held with the rearward end within the biasing slit of the rearward transducer biasing body 26 and with its two metallic terminal members 61 held assembled thereon, are so designed in relation to the shape and arrangement of the several transducer housing compartments 44, 45, 46, including the junction compartment 49 between compartments 44 and 45, as to make it possible to automatically load such transducer assembly on a loading fixture and to be automatically brought by the loading end of such loading fixture into the interior operative position within the housing space 43 of the transducer housing 41 through the open left end of the wider transducer compartment 44, as seen in Fig. 5.

In order to describe how such loading fixture may be utilized for automatically loading such transducer assembly in the operative position thereof within the transducer housing compartments, as described above, it will be assumed that the transducer housing 41 is held in a horizontal position corresponding to that shown in Fig. 5; and that the loading fixture enters the interior housing space 43 of the transducer housing 41 through the open end thereof, as seen at the left of Fig. 5 with the loading end of the fixture at the right end of the loading fixture. The right loading end of the fixture has an end portion which—when it enters fully into the interior housing space 43 of the transducer housing 41—will engage with its right conical end region the conical walls of the conical transducer compartment 49, and with the right fixture end face reaching an end position at the left end of the transducer compartment 45, as seen in Fig. 5. The loading fixture has loading and alignment compartment spaces shaped to receive and hold aligned therein the relatively narrow transducer structure 21 together with its wider elastomer body 26 and it two projecting metallic terminal members 61 when they are dropped into such loading compartment spaces through a generally horizontal open compartment side facing upwardly from the loading fixture, as seen in a position corresponding to the horizontal view of Fig. 5. With this arrangement, the transducer assembly may be automatically loaded into the loading compartment of the loading fixture vertically from the open side thereof.

The loading fixture is arranged to cooperate with a housing support on which the transducer housing is supported. One of them, for instance the housing support, has an automatic reciprocatory movement wherein its open outward end is moved in the direction to the left as seen in Fig. 5 against the rightward tool end of the loading fixture with the transducer assembly held aligned thereon until it is automatically brought into the interior of the transducer housing 41 into the position shown in Fig. 5. In order to provide the rearward elastomer body 26 of the transducer with the proper bias pressure characteristics, its thickness in released condition as seen in Fig. 3, is made suitably larger than the thickness in compressed condition, as seen in Fig. 5. When the transducer assembly is dropped in the loading compartment of the loading fixture, the rearward elastomer body 26 is automatically compressed in its loading compartment space in which it is received, to the same or slightly smaller thickness dimension than the dimension of its transducer housing compartment 45 as seen in Fig. 5, so that when the elastomer body is pushed into the transducer housing compartment 45, it will readily enter into this transducer compartment 45 and be held compressed therein under proper bias pressure. As an example, when released from housing pressure, the rearward elastomer body 26 has an over-all thickness, as seen in Fig. 3, of .144″. When held biased by the walls of the transducer housing compartment 45, the rearward elastomer bias body 26 is compressed from a thickness of .144″ in released condition to a compressed bias thickness of .120″ to provide the desired elastomer bias forces.

In the specific embodiment of the invention represented by the pickup of Figs. 1–10, the relatively elongated rearward elastomer bias body 26 may be designed to supply all of the biasing reaction forces required for proper distribution of the mechanical transducer strains applied to the transducer 21 by the movement of either one of the styli 31 transmitted thereto. In addition, the rearward elastomer bias body 26 is also utilized for restraining or preventing the transducer 21 from being moved laterally in a direction transverse to the direction of the stylus driving forces imparted to the transducer 21, which stylus driving forces are perpendicular or transverse to the major external transducer electrode surfaces 24. Such lateral movement restraint is secured by applying to the rearward edge regions of the transducer 21 extending transversely to the transducer electrode surfaces 24, restraining forces which suppress and prevent any movement of the transducer 21 in a direction parallel to its extended electrode surfaces 24. In the form of pickup shown, such lateral transducer movement restraint in a direction parallel to its major electrode surfaces 24 is secured by making the body portions of the rearward elastomer body 26 which overlie the edge sides of the rearward transducer portion 21—2 within the elastomer body slot 26—1 of such small thickness and such relatively great stiffness and rigidity as to cause these edge-overlying elastomer body portions to lock and clamp such edge regions of the transducer 21 and prevent lateral movement thereof in a direction parallel to its transducer electrode surfaces 24.

The additional elastomer body 28 which holds biased a short length of an intermediate transducer region 21—3 may likewise be made with narrow body portions for applying similar clamping engagement to the underlying edge surfaces of this intermediate transducer region 21—3 and thereby additionally restrain the transducer 21 against lateral movement in a direction parallel to its transducer electrode surfaces 24. In practice, the additional elastomer bias body 28 serves principally to apply resonant-peak damping forces to the vibratory transducer structure 21, and lateral transducer-motion restraint is principally or fully supplied by the thin body portions of the rearward elastomer body 26 held confined between the transducer edges and the rigid walls of the transducer housing 41 bounding the rearward housing compartment 45.

The rotatable housing member 41 with its outer rotary seat surface 42 is rotatably supported on a rotary guide structure 71 of a mounting support by means of which it is affixed in operative position in the tone arm 11, as seen in Figs. 1 and 2. Although it may form an integral part of the mounting support 70, the guide structure 71 is shown as a separate unit which is affixed to a mounting bracket 80 by means of which it is affixed to the tone arm. The guide structure 71 is formed of a strip of spring sheet metal bent to provide a central mounting section 72 having two segmental arcuate guide and clamping arms 73 elastically biased to guide between them the seating surface 42 of the transducer housing 41 and retain it biased between the clamping arms 73 in its operative position on the tone arm 11. The complementary bracket 80 of the mounting structure 70 is likewise formed of sheet metal and has a central section 81 to which the interfitting central mounting section 72 of guide arm structure 71 is suitably secured. In the form shown, the central bracket section 81 has two struck-out lugs 82 passing through clamping slots 74 of the central guide sheet section 72 and clampingly bent over its downward surface, as seen in Fig. 4. The central bracket sheet section 81 is adjoined by two bent side arms 83 which terminate in laterally and outwardly bent clamping arms 85 having cut-outs or openings 86 for receiving clamping screws such as shown at 11—1 in Fig. 1, by means of wich bracket 81 is clamped to the support lug of tone arm 11.

The arcuate guide arms 73 of guide member 71 have outwardly diverging lips 75 shaped for engagement with rotary housing guide surface 42 when housing member 41 is interchangeably pushed inwardly into its operative position of Figs. 1, 2, 4 and 5, by means of which the pickup is held in the operative position. This makes possible ready exchange and replacement of one transducer-housing unit 41 with another, by gripping it with the fingers and removing it from between the spring arms 73 which hold it clamped in a rotary position on the mounting support 70, or to replace it by bringing the seating surface 42 of the housing member between the spring arm lips 75 and pushing the housing unit 41 with its seating surface 42 into the operative position between spring arms 73.

The transducer housing unit 41 also has as an integral part thereof, a laterally projecting grip arm 51 by means of which it may be easily turned from one stylus position to the opposite stylus position. Such housing 41 may be produced by molding from suitable material, such as metal or synthetic resin. In the commercial form of pickup shown, the housing is made from synthetic resin material. The cooperating housing and guide members of the pickup also have means for assuring that the transducer housing unit 41 is retained in either one of the two end positions corresponding to the positions of engagement of the respective two styli 31 with the record groove. To this end, the bracket sheet 80 has struck therefrom two stop arms 87 which are bent outwardly and shaped to be engaged by housing grip arm 51 when it brings the transducer-housing unit 41 to either one of its opposite stylus positions. The transducer-housing unit and the mounting structure 70 also embody means which retain the interchangeable transducer-housing unit 41 in proper axial position. To this end, the housing 41 is provided with a circular stop rim 52 at the rear end thereof, as seen in Fig. 3, and with a wider forward housing body part 53 rising outwardly from the circular housing seating surface 42, so that they face and remain in sliding engagement with the opposite edge surfaces 76 of the two arcuate guide arms 73 of housing guide structure 71.

The rotary transducer-housing unit 41 and its mounting structure 70 of the turnover pickup embody also simple means for causing the transducer housing unit to be brought with a snap action to one or the other of the opposite end positions when it is moved from one stylus position past a neutral position toward the opposite stylus position. The central sheet section 81 of the forward part of sheet bracket 80, as seen in Figs. 1–4, has formed thereon a central rounded outwardly bent stop ridge 88 shaped to lockingly engage the side surfaces 56 of either one of two locking recesses 55 formed on the exterior of the wider forward section 53 of transducer housing 41. The opposite side surfaces 56 of each of the two opposite housing locking recesses taper outwardly and sideward, so that—on turning the housing unit 41 to an opposite stylus position—the respective tapered recess surfaces 56 on coming into engagement with the bracket bias ridge 88, will be actuated thereby and by the spring forces of guide and clamping arms 73 to move with a snap action to its new stylus position.

With this arrangement, when transducer housing unit 41 starts turning from one stylus position to an opposite stylus position, the respective housing locking recess 55 will ride with one of its tapered recess surfaces 56 over the rounded surface of bracket ridge 88, thereby forcing housing 41 somewhat away from the inward operative position between the spring guide arms 73 until, upon continued rotation of housing unit 41, the respective tapered recess surface 56 starts coming into engagement with the rounded bracket ridge 88. Thereupon, the biasing spring action of the spring guide arms 73 cause the transducer housing 41 to be brought with a snap action into its new operative stylus-engaging position, as the bracket ridge 88 engages the respective tapered housing recess surface 56 and thereby drives and rotates the transducer housing 41 to its new stylus end position.

With a turnable transducer housing unit 41 of the type described above, a turning motion will also be imparted to the associated circuit leads which are connected to the rearward metallic terminals 61 of the turnable unit 41. To eliminate the need for turning the associated circuit leads, a pickup of the invention of the type described above may be provided with an associated fixed terminal unit having fixed terminals to which the associated circuit leads are connected, and which are arranged to be connected to the respective rotated terminals of the turnable transducer unit in either one of its different stylus positions.

Figs. 4, 6 and 7 show one form of such fixed terminal unit 90 for a turnable transducer unit of the type shown. The terminal unit has a relatively rigid mounting member 91, made of insulating material, for instance in the form of a relatively thick molded flat member shaped to face with one flat face the rearward end surface of the pickup and be held joined or affixed thereto. The upper region of mounting member 91 has a mounting slit 92 shaped to receive with a forced, tight securing fit, a rearward sheet junction tongue portion 87 of the central bracket sheet section 81. The side edges of junction tongue 87 may be provided with locking teeth 87—1 tapered to enter the mounting slit 91 when forced into it. The opposite edges of the locking teeth 87—1 have similarly directed taper, thereby becoming interlocked with the adjacent body portion of mounting member 91 and holding it in the desired position shown adjacent the pickup.

The mounting member 91 is provided with a wide, gate-like opening or space 93 bordered by two gate arms 94 between which the two terminal end portions 61 of the turnable transducer housing 41 rotate when turned from either one to the other stylus position. The mounting member 91 has two mounting slits 95 at the region where its two side arms 94 emerge, for holding affixed in these slits, mounting portions 96 of two fixed metallic terminal members or strips 97 which extend rearwardly in a direction away from the pickup so that the associated circuit leads may be connected thereto. The two mounting slits 95 are dimensioned to receive the rear end 96 of the respective terminal strips 97 with a forced, tight securing fit for holding the terminal strips 97 firmly in position thereon. The mounting portions 96 of the two terminal strips 97 are provided with locking teeth 98 similar to those of the bracket junction tongue 87 so that after being forced into their respective mounting slits 95, they will remain locked therein. The two mounting slits 95 within which the terminal strips 97 are held fixed, are so arranged that portions of the terminal strips 97 emerging from the mounting strips 95 are exposed between the side arms 94 to the open gate space 93 into contact engagement with the respective terminal end portions 61 of the turnable transducer housing member 41 when it is in either one of its opposite stylus positions. With this arrangement, rotation of the turntable transducer housing 41 from one stylus position to the opposite stylus position, causes the rearward ends of the two terminal members to turn therewith and establish similar contact connections with the pair of fixed external terminal members 97 of the fixed terminal unit 90.

In order to enable ready practice of the invention, but without thereby limiting the scope of the claims, there are given below, data of a commercial form of pickup based on the principles of the invention.

The piezoelectric transducer unit 21 is .550 inch long, .063 inch wide, and .024 inch thick. The total length of the transducer unit 21 together with the stylus junction member 32 affixed thereto is 1 inch. When uncompressed, the elastomer bias body 26 is .155 inch long, .144 inch thick in its major transverse direction, and $\frac{3}{32}$ inch thick in the other transverse direction. The other dimensions are obvious from the dimensional relationship of the various parts as shown in the drawings.

In our co-pending application Serial No. 34,924, filed June 9, 1960, and assigned to the same assignee, there are claimed features of the phonograph pickup disclosed herein, comprising a transducer housing member with a rotary seating surface turnable along a rotary support member between two opposite stylus positions for bringing either one of two transducer-driving styli into a record-groove-engaging position, wherein one of two opposite exterior locking portions of the housing member is arranged to be interlocked with a complementary locking portion of the support member in each of the two opposite stylus positions, with the locking portion of one of said two members being shaped as a locking recess having oppositely-directed, divergent surfaces shaped for engagement with the complementary locking portion of the other member which has the shape of a locking portion arranged so that when—upon turning said housing member towards an opposite stylus position—one of said divergent surfaces comes into engagement with the complementary locking projection, the engaged locking portion of said housing member will be driven by the complementary locking portion of said support member to cause said housing member to be turned into said opposite stylus position.

It will be apparent to those skilled in the art that the novel principles of the invention disclosed herein in connection with specific exemplifications thereof, will suggest various other modifications and applications of the same. It is accordingly desired that in construing the breadth of the appended claims they shall not be limited to the specific exemplifications of the invention described above.

We claim:

1. In a piezoelectric phonograph pickup device, an integral, relatively rigid, elongated housing having an elongated interior housing space extending along a housing axis with a rear housing opening and a front housing opening at the opposite axial ends of said housing space, an elongated piezoelectric transducer extending within said housing space along said housing axis, said transducer having an elongated rearward restrained transducer region and a forward vibratory transducer region arranged to be driven by a groove-engaging stylus, said transducer having extended, oppositely facing exterior transducer electrode surfaces along said restrained transducer region, a tubular elastomer body of elastomer material surrounding and engaging with a tight fit said restrained transducer region, at least two metallic terminal strips having each a contact portion and a rearward exposed terminal portion, said tubular elastomer body holding with its said tight fit the contact portions of said two terminal strips in individual engagement with said exterior transducer electrode surfaces, said transducer and said elastomer body constituting with said two terminal strips a self-supporting assembly which is movable as a unit through one of said housing openings into its operative position within said interior housing space, side walls of said elastomer body being mounted between two rigid opposite housing walls of said housing, said opposite housing walls having a predetermined spacing for elastically deforming said elastomer body held therebetween and exerting pressure against the underlying contact portions of said terminal strips and the underlying oppositely facing electrode surfaces of said restrained transducer region to maintain firm electrical connection between said respective contact portions and electrode surfaces, the terminal portions of said terminal strips being exposed through said rear opening to engagement with external circuit terminals.

2. In a piezoelectric phonograph pickup device, an integral, relatively rigid, elongated housing having an elongated interior housing space extending along a housing axis with a rear housing opening and a front housing opening at the opposite axial ends of said housing space, an elongated piezoelectric transducer extending within said housing space along said housing axis, said transducer having an elongated rearward restrained transducer region and a forward vibratory transducer region arranged to be driven by a groove-engaging stylus, said transducer having extended, oppositely facing exterior transducer electrode surfaces along said restrained transducer region, a tubular elastomer body of elastomer material surrounding and engaging with a tight fit said restrained transducer region, at least two metallic terminal strips having each a contact portion and a rearward exposed terminal portion, said tubular elastomer body holding with its said tight fit the contact portions of said two terminal strips in individual engagement with said exterior transducer electrode surfaces, said transducer and said elastomer body constituting with said two terminal strips a self-supporting assembly which is movable as a unit through said front opening of said housing openings into its operative position within said interior housing space, side walls of said elastomer body fitting and being mounted between two rigid opposite restraining walls of a restraining compartment in said housing space, said restraining walls having a predetermined spacing for elastically deforming said elastomer body held therebetween and exerting pressure against the underlying contact portions of said terminal strips and the underlying oppositely facing electrode surfaces of said restrained transducer region to maintain firm electrical connection between said respective contact portions and electrode surfaces, said housing having a rearward terminal compartment extending between said restraining compartment and said rear opening and being of smaller cross-sectional area than said restraining compartment, axially transverse wall surfaces of said housing space being abutted by axially transverse surfaces of said elastomer body for thereby fixing the operative position of said elastomer body, said transducer and said terminal strips.

3. In a piezoelectric device as claimed in claim 2, said terminal strips having terminal extensions extending through said terminal compartment and being exposed through said rear opening to engagement with external circuit terminals.

4. In a piezoelectric device as claimed in claim 2, the inward contact portions of each of said terminal strips and said assembly unit having at least one laterally extending shoulder portion and being of greater width than its said terminal extension for abutting with said shoulder portion against said axially transverse wall surfaces and thereby additionally fixing the position of said terminal strips and said assembly unit within said housing.

5. In a piezoelectric device as claimed in claim 2, the outward terminal extensions of each of said terminal strips each having at least one resilient locking tongue elastically biased away from the plane of its strip surface shaped to lockingly engage the rearward end surface portions of said housing beyond which said terminal extensions project.

6. In a piezoelectric device as claimed in claim 2, each of said outward terminal extensions having two of said resilient locking tongues along their opposite lateral edge regions.

7. In a piezoelectric device as claimed in claim 2, said terminal strips being exposed through said rear opening to engagement with external circuit terminals, the inward contact portions of each of said terminal strips having at least one laterally extending shoulder portion and being of greater width than its said terminal extension for abutting with said shoulder portion against said axially transverse wall surfaces and thereby additionally fixing the position of said terminal strips and said assembly unit within said housing.

8. In a piezoelectric device as claimed in claim 7, the outward terminal extensions of each of said terminal strips each having at least one resilient locking tongue elastically biased away from the plane of its strip surface shaped to lockingly engage the rearward end surface portions of said housing beyond which said terminal extensions project.

References Cited in the file of this patent

UNITED STATES PATENTS

| | | |
|---|---|---|
| 2,699,470 | Koren | Jan. 11, 1955 |
| 2,851,541 | Wood | Sept. 9, 1958 |